(12) United States Patent
Kessel et al.

(10) Patent No.: US 10,439,745 B2
(45) Date of Patent: Oct. 8, 2019

(54) ERROR CONCEALMENT

(71) Applicant: NXP B.V., Eindhoven (NL)

(72) Inventors: Christian Kessel, Nijmegen (NL); Hendrik Jan Kelder, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/849,680

(22) Filed: Dec. 21, 2017

(65) Prior Publication Data
US 2018/0183550 A1 Jun. 28, 2018

(30) Foreign Application Priority Data
Dec. 22, 2016 (EP) .................................. 16206259

(51) Int. Cl.
*H04H 20/20* (2008.01)
*H04H 60/11* (2008.01)
(Continued)

(52) U.S. Cl.
CPC ............ *H04H 20/20* (2013.01); *H04H 60/11* (2013.01); *H04L 1/0045* (2013.01); *H04L 1/203* (2013.01); *H04L 49/90* (2013.01); *H04H 2201/60* (2013.01)

(58) Field of Classification Search
CPC ........ H04H 20/20; H04H 20/22; H04H 60/11; H04H 2201/20; H04L 12/861; H04L 1/20;
(Continued)

(56) References Cited

U.S. PATENT DOCUMENTS 5,163,132 A 11/1992 DuLac et al.
5,940,444 A 8/1999 Jenkin et al.
(Continued)

FOREIGN PATENT DOCUMENTS

CA        2415424 A1 * 1/2003 ........... G10L 19/005
DE   102005041653 A1    3/2007
EP     3 089 385 A1    11/2016

OTHER PUBLICATIONS

Wiese, Source repated error concealmnet techniques for digital audio bradcasting (DAB) considering the listeners perception, 1991, IEEE, pp. 0_85 to 0_86.*

(Continued)

*Primary Examiner* — Shelly A Chase
(74) *Attorney, Agent, or Firm* — Rajeev Madnawat

(57) ABSTRACT

An apparatus and method are provided. The apparatus comprises a plurality of inputs, a plurality of receive buffers, a processor and an output. The plurality of inputs are configured to receive a plurality of data streams. Each data stream comprising a respective plurality of data blocks carrying common content. The plurality of receive buffers are each configured to store the data blocks of a respective on of the plurality of data streams including storing quality information associated with each data block. The processor is configured to select stored data blocks from the respective buffers to form an output data stream carrying the common content. The processor is further configured to carry out signal processing on the selected data blocks in dependence on the associated quality information. The output is configured to output the selected and error concealed data blocks. The quality information associated with each data block corresponds to a quality experienced by a receive path at the time of reception of each data block.

15 Claims, 6 Drawing Sheets

(51) Int. Cl.
*H04L 1/00* (2006.01)
*H04L 1/20* (2006.01)
*H04L 12/861* (2013.01)

(58) Field of Classification Search
CPC .... H04L 1/203; H04L 1/0045; H03M 13/356; H03M 13/6312; G10L 19/005; G10L 19/0017
See application file for complete search history.

(56) References Cited

U.S. PATENT DOCUMENTS

| | | | |
|---|---|---|---|
| 6,378,101 B1 * | 4/2002 | Sinha | H04L 1/0047 714/755 |
| 6,434,606 B1 | 8/2002 | Borella et al. | |
| 6,526,495 B1 | 2/2003 | Sevalia et al. | |
| 6,851,083 B1 * | 2/2005 | Hagenauer | H03M 13/356 714/774 |
| 2002/0046307 A1 | 4/2002 | Treggiden | |
| 2008/0032663 A1 | 2/2008 | Doyle | |
| 2008/0139109 A1 | 6/2008 | Ewertz | |
| 2010/0271944 A1 | 10/2010 | Michaelis et al. | |
| 2011/0243155 A1 | 10/2011 | Gondo et al. | |
| 2012/0331190 A1 | 12/2012 | Nakagawa et al. | |
| 2013/0343576 A1 | 12/2013 | Pahuja | |
| 2015/0079916 A1 | 3/2015 | Wolf et al. | |
| 2016/0119066 A1 | 4/2016 | Oldewurtel et al. | |
| 2016/0241350 A1 | 8/2016 | Nekhamkin et al. | |
| 2017/0195243 A1 | 7/2017 | Bohn et al. | |
| 2018/0183550 A1 | 6/2018 | Kessel et al. | |

OTHER PUBLICATIONS

Wah et al, A survey of error concealment schemes for Real-time audio and video transmission over the internet, 2000, IEEE, pp. 17 to 24.*

Sanneck et al., A new technique for Audio packet loss concealment, 1996, IEEE, pp. 48 to 52.*

Non-Final Rejection for U.S. Appl. No. 15/843,388 7 pgs. (dated Sep. 10, 2018).

Final Rejection for U.S. Appl. No. 15/843,388 10 pgs. (dated Nov. 9, 2018).

Non-Final Rejection for U.S. Appl. No. 15/843,388 11 pgs. (dated May 15, 2019).

* cited by examiner

ERROR CONCEALMENT

CROSS-REFERENCE TO RELATED APPLICATIONS

This application claims the priority under 35 U.S.C. § 119 of European Patent application no. 16206259.0, filed on Dec. 22, 2016, the contents of which are incorporated by reference herein.

FIELD

This invention relates to the storing and error processing of broadcast data in a multiple source receiver and in particular but not exclusively to the use of quality information associated with stored audio data from multiple sources in a multiple source audio receiver.

BACKGROUND

Some modern broadcast receiver devices are designed to support multiple audio inputs from different broadcast domains. For example end user content (such as a radio show) may be received via audio streams from domains such as frequency modulation broadcasting (FM), digital audio broadcasting (DAB) and/or Internet radio. The transmit paths of these audio stream may have varying processing delays which result in streams that are misaligned in time. Initial processing at the receiver may misalign the audio streams further.

It may be a requirement for the broadcast receiver to switch from one audio stream or input to another, for example an input may be lost when the receiver moves out of range of the input's source. Due to the misalignment, the transition may not be seamless which degrades user experience. For example when switching from a transmit path with a short processing delay to a transmit path with a long processing delay, data may not yet be available on the high processing delay path. A potential approach to address this is the buffering of the received audio streams in order to realign the incoming data. However some information associated with a path may be lost when buffering.

Embodiments of the present application may be concerned with the quality of data buffered in a multi-source receiver.

SUMMARY

According to a first aspect, there is provided a method comprising: receiving a plurality of data streams, each data stream comprising a respective plurality of data blocks carrying common content; storing the data blocks of each data stream in a respective buffer including storing quality information associated with each data block; selecting stored data blocks from the respective buffers to form an output data stream carrying the common content and carrying out signal processing on the selected data blocks in dependence on the associated quality information; and outputting the selected and error concealed data blocks; wherein the quality information associated with each data block corresponds to a quality experienced by a receive path at the time of reception of each data block.

The signal processing may comprise error processing. The error processing may comprise identifying a first data block having associated quality information that is below a quality threshold. The method may further comprise identifying one or more data blocks neighbouring the identified first data block. The error processing may further comprise applying a filter to the identified first data block and one or more neighbouring data blocks. The filter may be one of a muting, high cut and/or low cut filter. The identified first data block and neighbouring data blocks may be identified within each respective buffer. The method may further comprise storing the selected data blocks in an output data stream buffer. The identified first data block and neighbouring data blocks may be identified within the output stream buffer.

Each of the plurality of data streams may be received from a respective receive path. The error processing may be error concealment processing. The signal processing may comprise equalising data streams from two of the respective buffers. The method may further comprise delaying one or more of the plurality of data streams to align the common content by storing the plurality of data streams in the respective plurality of buffers. Each respective buffer may comprise a data buffer portion for storing the plurality of data blocks of the respective data stream and an associated quality buffer portion for storing quality information associated with each of the plurality of data blocks. Each buffer may be a first in first out FIFO and read pointers for each of the buffers are synchronised.

According to a second aspect, there is provided an apparatus comprising: a plurality of inputs configured to receive a plurality of data streams, each data stream comprising a respective plurality of data blocks carrying common content; a plurality of receive buffers, each configured to store the data blocks of a respective on of the plurality of data streams including storing quality information associated with each data block; a processor configured to select stored data blocks from the respective buffers to form an output data stream carrying the common content and carrying out signal processing on the selected data blocks in dependence on the associated quality information; and an output configure to output the selected and error concealed data blocks; wherein the quality information associated with each data block corresponds to a quality experienced by a receive path at the time of reception of each data block.

The processor may be configured to carry out error processing. The processor may be configured to identify a first data block having associated quality information that is below a quality threshold. The processor may be configured to further identify one or more data blocks neighbouring the identified first data block. The processor may be configured to apply a filter to the identified first data block and one or more neighbouring data blocks. The filter may be one of a muting, high cut and/or low cut filter. The identified first data block and neighbouring data blocks may be identified within each respective buffer. The apparatus may further comprise an output data stream buffer configured to store the selected data blocks in an output data stream buffer. The identified first data block and neighbouring data blocks may be identified within the output stream buffer.

The plurality of inputs may be configured to receive each of the plurality of data streams from a respective receive path. The error processing may be error concealment processing. The signal processing may comprise equalising data streams from two of the respective buffers. Each respective buffer may be a first in first out FIFO and read pointers for each of the buffers are synchronised.

FIGURES

Embodiments will be described, by way of example only, with reference to the drawings, in which.

It will be appreciated that for features that span more than one drawing like reference numerals indicate the like feature.

DETAILED DESCRIPTION

Figure 1:
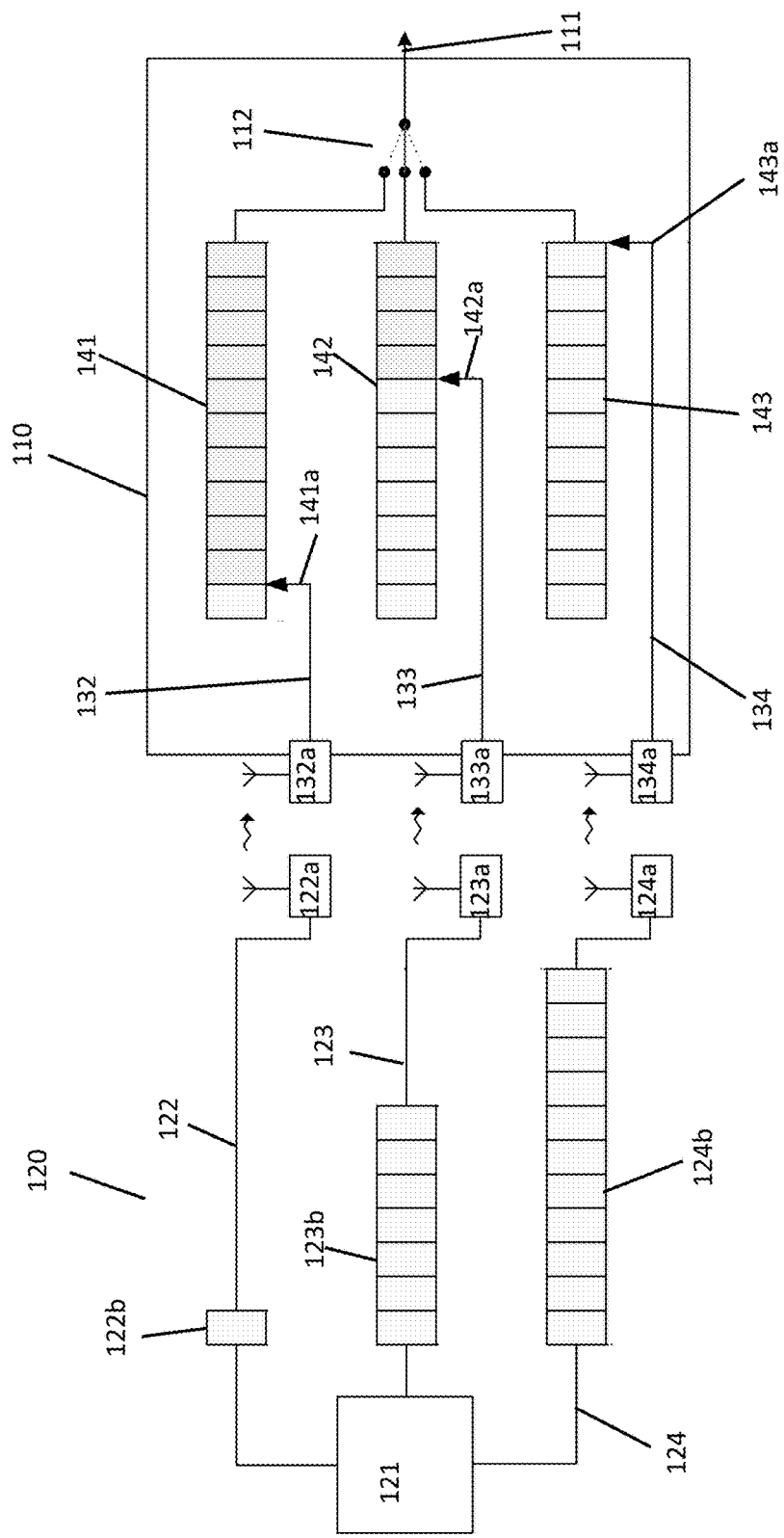
FIG. 1 is an example schematic of a multiple source receiver.

The following embodiments may be described with reference to packet streams carrying audio data. This has been done for ease of explanation only and it will be appreciated that at least some embodiments may be applicable to other types of broadcast or streaming data, for example video data. It will be appreciated that here the term broadcast is intended to cover packet streams broadcast from one entity to multiple other entities as well as packet stream broadcast from one entity to a specific few or a particular one other entity. For example, the broadcast packet stream may be a unicast stream.

In multi-source transceiver systems, content may be transmitted via a plurality of paths corresponding to different transmission technologies. The content may be commonly generated at a common data source but may be processed and transmitted via different transmit paths. Examples of such transmit technologies may include frequency modulation (FM), digital audio broadcasting (DAB), internet broadcasting and/or others. A multi-source receiving device may be able to receive transmissions of the content along two or more of these paths however, due to processing delays of the respective paths, the commonly generated content carried on the transmission paths may become misaligned.

The receiving device may rely on the content from a first transmission paths to be rendered and provided to a user. If the first transmission path becomes unavailable, the receiving device may switch to provide the content from the second transmission path instead. For example, a user may be listening to the content received via an FM transmission while driving, when they drive into a tunnel and lose their FM signal. The receiving device may then switch to a second transmission, for example a DAB transmission path, to continue to provide the content to the user. Due to the differences in a processing time on the first and second paths, the content received and the first path and the content received on the second path may be misaligned. In order for the switch between the first and second path to be less noticeable, the content on the respective paths needs to be aligned. The receiving device may do this by delaying the content from the path that is ahead in time until at least a portion of the content has been received from the first and second paths. The receiving device can introduce this delay by buffering the received data from the first and second paths.

The receive quality may be determined for each transmission/receive path of the receiving device. The quality may for example correspond to channel conditions of the transmit/receive path. The quality may correspond to the current receive quality experienced on a transmit/receive path at the receiving device, however because the data is buffered, the currently experienced quality may not be valid. For example, even though a receiver of the receiving device may be currently experiencing good quality, the buffered data may have been received at a time at which the receiver was experiencing a lower quality. A decision to switch between receive paths based on a current measurement of quality may not be entirely accurate.

FIG. 1 is an example of a transceiver system that preserves quality information associated with buffered data. This may assist in selecting a receive path for providing data to be rendered.

FIG. 1 shows an example of a multi-source broadcast system 100 comprising a receiving device 110 and a transmitting device 120. The transmitting device 120 comprises a common data source 121 and three transmit paths 122, 123 and 124. The common data source 121 may generate content to be transmitted via respective paths 122, 123 and 124. Each transmit path comprises a transmitter 122a, 123a and 124a and a processing delay 122b, 123b and 124b associated with that path.

Each of the transmit paths 122, 123 and 124 may transmit the content according to a different transmission technology. For example the first path 122 may transmit the content based on an analogue technology such as frequency modulation (FM); the second path 123 may transmit the content according to a digital transmit technology such as digital audio broadcasting (DAB); and the third transmit path 124 may transmit the content according to technology such as an internet broadcast.

Each of the three transmit technologies may be associated with a delay that is caused by the different processing that the content undergoes before it can be transmitted by the respective transmitters 122a, 123a and 124a. For example, the processing on the first path 122 may cause the content to experience a first delay 122b, the processing on the second path 123 may cause the content to experience a second delay 123b and the processing on the third path 124 may cause the content to experience a third delay 124b. In the above examples, the paths have been exemplified as being FM, DAB and internet broadcast. Accordingly, the first delay 122b associated with FM is relatively short, for example a time A (depicted as one delay block). The second delay 123b associated with DAB is longer, for example a time B (depicted as seven delay blocks). The third delay 124b, associated with internet broadcast, may experience the longest delays, for example a time period C (depicted with eleven delay blocks).

It will be appreciated that the number of delay blocks is by way of example only and functions to indicate the differing delays experienced by content generated by a common data source 121 along each path. Accordingly, corresponding content on each path reaches the respective transmitter 122a, 123a and 124a at differing times and the content along the three paths is misaligned with respect to time. For example, the content on the second path 123 may be misaligned by a time (B-A) with respect to the content on the first path 122. The content on the third path 124 may be misaligned by a time (C-A) with respect to the content on the first path 122 and by a time (C-B) with respect to the content on the second path 123.

The receiving device 110 comprises three receive paths 132, 133 and 134, each comprising a respective receiver 132a, 133a, 134a and delay buffer 142, 143 and 144. Data streams comprising the content received on each of the paths 132, 133 and 134 are stored in the respective delay buffer 141, 142 and 143 for that path. An output of the delay buffers is coupled to an output 111 via a selection mechanism 112. The output 111 provides data from a selected delay buffer to be rendered and to provide to a user, for example via a speaker. The rendering may include decoding and further processing to output the content.

In this example each of the receiver paths 132, 133 and 134 are configured to receive a data stream comprising the commonly generated content and transmitted according to a different transmission technology. For example, the first receive path 132 may be configured to receive the content transmitted in accordance with FM; the second receive path 133 may be configured to receive the content transmitted in accordance with DAB; and the third receive path 134 may be configured to receive the content transmitted in accordance with internet broadcast.

For example, the first receive path 132 may be configured to receive the content transmitted from the first transmit path 122; the second receive path 133 may be configured to receive the content transmitted from the second transmit path 123; and the third receive path 134 may be configured to receive the user content transmitted from the third transmit path 124.

The respective receivers 132a, 133a and 134a receive respective data streams comprising the content. The content in the data streams may be misaligned due, at least in part, to the delays A, B and C introduced by the relative processing paths 122, 123 and 124. In order to realign the content, the receiving device 110 may delay or buffer the respective data streams until at least some corresponding content has been received on each stream. For example, the streams may be buffered until at least a portion of the user content is received at each receive path. In general, the delay buffers may delay the availability of data in the buffers to the output for a period corresponding to the delay between the fastest and slowest transmission path. In this manner, data only becomes available to the output, when corresponding user content has been receiver on all the paths. At this point in time onwards, the data in the buffers (comprising the content) may be made available to the output 111 for rendering.

Delaying the respective data streams may comprise storing received data in a respective data buffer. In the example of FIG. 1, the first path 122, 132 has the shortest processing delay and is the first to start receiving data. The received data stream on the first path is written to the first delay buffer 141. A write pointer 141a of the first delay buffer 141 indicates an amount of data that has been written to the first buffer. The delay between the first and second paths is (B-A) and so the first path 132 receives data for a period of (B-A) before the second path starts receiving data. When data is received on the second path 133, it is written into the second delay buffer 142. A write pointer 142a indicated the amount of data that has been written to the second buffer.

The delay between the first and third paths is (C-A) and so the first path 132 receives data for a period of (C-A) before the third path starts receiving data. The delay between the second and third paths is (C-B) and so the second path 133 receives data for a period of (C-B) before the third path 134 starts receiving data. A write pointer 143a indicates the amount of data written to the third buffer.

FIG. 1 depicts the state of the delay buffers 141, 142 and 143 when a first unit of a data stream comprising the content is received and stored in the third buffer 143. At this point, the first receive path 132 has been receiving the content for a time period of (C-A) and the second receive path 133 has been receiving the content for a time period of (C-B) and the third receive path 134 has just received its first unit of the content. At this point at least a portion of the content is available in all three of the delay buffers 141, 142 and 143 and so the data in the delay buffers 141, 142 and 143 becomes available for selection to be provided to the output 111.

In this example it is shown that at least one data block of the data stream is buffered for the receive path experiencing the highest delay, however it will be appreciated that in other examples the data stream for this path may not be buffered at all and may be made available immediately for output. In an example, the buffers are arranged as first-in first-out (FIFO) buffers, however, it will be appreciated that the buffers may take any suitable form.

The read pointers of each buffer 141, 142 and 143 may initially point to the first unit of the content in each buffer and may be synchronised so that they are updated simultaneously regardless of which buffer is coupled to the output 111. In this manner, if the receive paths are switched between (the switching mechanism 112 couples a different buffer to the output 111) the read pointers of all the buffers point to the same position with respect to the content. It will be appreciated that the delay buffers may be of a size to cater to the maximum delay between the fastest and slowest transmit paths.

A receiver 132a, 133a, 134a may be configured to make a determination of a quality experienced by a receive path 132, 133, 134. This determination may be based on characteristics of the received data stream, for example a channel quality experience by the received data stream. The quality information may be provided to the selection mechanism to aid in the selection of the receive path to be coupled to the output. The quality experience by a receiver may differ over time. Thus the current measurement of quality may not correspond to a quality experience at the time buffered data was received.

Embodiments of the present application further provide quality buffers associated with each delay buffer which store an indication of quality of corresponding received data in the delay buffer. In this case a decision of which receive path to couple to the output may be made in dependence on the quality experienced by that path at the time at which the data was received. The availability of quality information associated with each buffered block may be used in error concealment processing to conceal errors that may occur when no block of sufficient quality are available to be rendered to the output.

Figure 2:
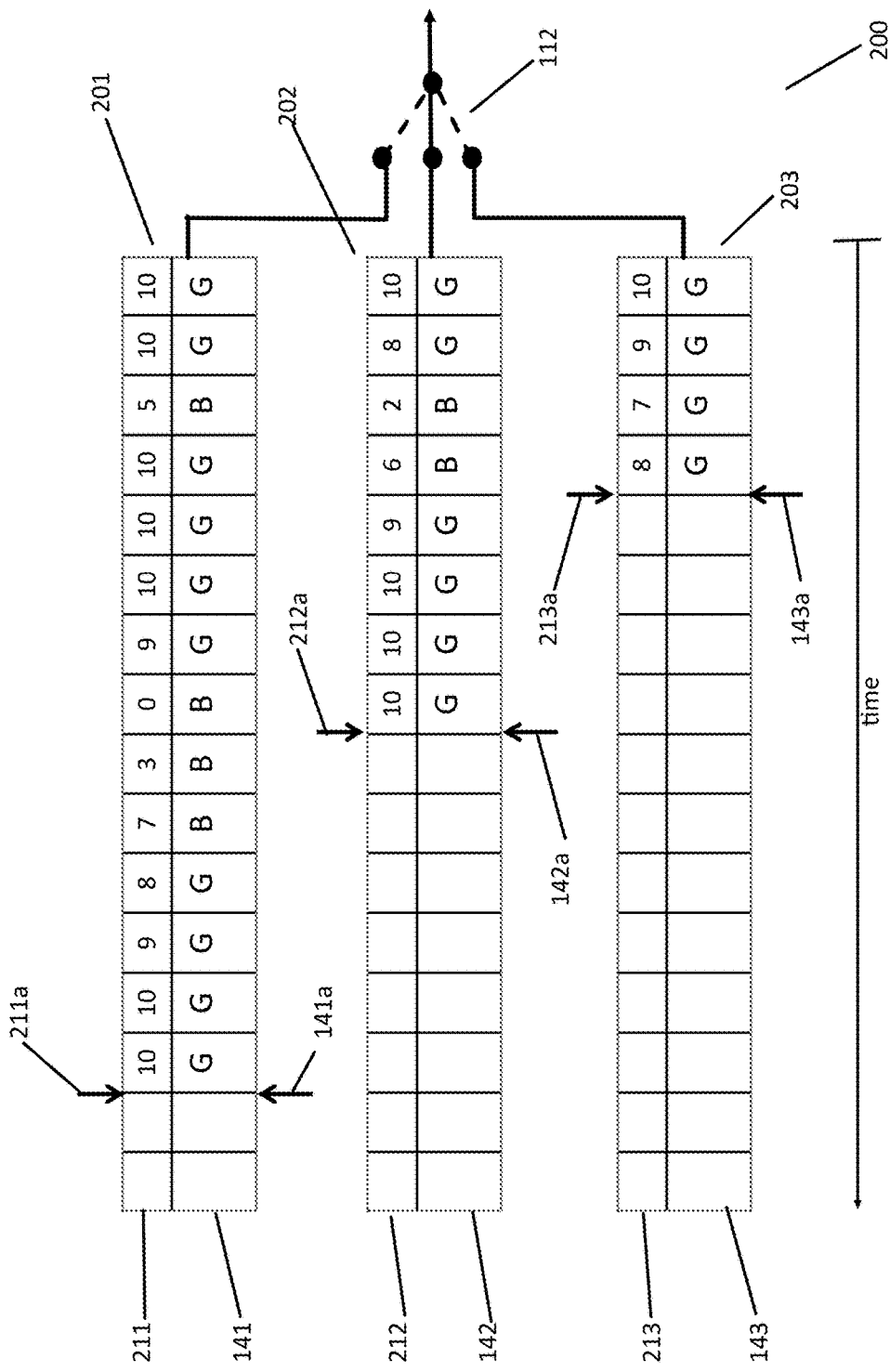
FIG. 2 shows an example of delay buffers in accordance with an example.

FIG. 2 shows an example of delay buffers in accordance with an embodiment. The delay buffers 200 comprise a first delay buffer 201 corresponding to a first receive path 132, a second delay buffer 202 corresponding to a second receive path 133 and a third delay buffer 204 corresponding to a third receive path 134. An output from each of the delay buffers is coupled to a selection mechanism 112 which provides data from a selected one of the delay buffers to an output 111.

Each of the delay buffers 201, 202, 203 comprises a data buffer portion 141, 142, 143 and a quality buffer portion 211, 212, 213. For example, the first delay buffer 201 comprises a first data buffer portion 141 and a first quality buffer portion 211. The second delay buffer 202 comprises a second data buffer portion 142 and a second quality buffer portion 212. The third delay buffer 203 comprises a third data buffer portion 143 and a third quality buffer portion 213.

Each of the data buffer portions 141, 142, 143 is associated with a respective write pointer 141a, 142a, 143a which point to a position within the data buffer portion to be next written to with an incoming data stream on the receive path. As described in relation to FIG. 1, data is written to the respective data buffer portions when it is received by the respective receive path. The received data on the respective paths may be offset in time due to differing processing delays experienced on the transmission paths from the transmitting device. Each of the data buffer portions may further comprise a read pointer indicating data available to be read. In the example of FIG. 2, the buffers are FIFOs and the position of the read pointer is indicated as the first position in the buffer. In order to realign the data in the buffers, data is only begun to be made available when at least a portion of corresponding data is available in all the buffers. The read pointer of the buffers is synchronised so that the respective read pointers point to corresponding data even for the buffers not selected as output.

Each of the quality buffer portions 211, 212 and 213 are associated with the respective data buffer portions 141, 142, 143 of the data buffer 201, 202, 203 and store quality information corresponding to the data in the buffer. In the example of FIG. 2, each of the quality buffer portions comprise a write pointer 211a, 212a, 213a which indicate a position in the quality buffer portion to be written to next. Because the quality information corresponds to a data block, the write pointers of a quality buffer portion and a data buffer portion are synchronised. For example, the quality buffer portion 211 is associated with the data buffer portion 141 and stores quality information corresponding to each block of data in the data buffer portion 141. For each block of stored data, the quality information is generated at the time of the reception of a corresponding block of data and is stored as the corresponding block of data is stored.

While we have exemplified having two pointers—one to the data block portion and one to the quality information portion of a buffer, it will be appreciated that in some embodiments one pointer may be used to point to both the data block and associated quality information.

In FIG. 2, the quality information stored in the respective quality buffer portions 211, 212, 213 is indicated as having a value of 0 to 10 where 0 is the lowest quality and 10 is the highest quality available. For clarity of explanation, data blocks in the data buffer portions are indicated as G or B where G (good) indicates that a data block is of a sufficient quality to be rendered to the output and B (bad) indicates that the data block is of an insufficient quality to be rendered to the output. The receiving device may determine whether a data block is of sufficient quality (G) or insufficient quality (B) independent on the corresponding quality in the associated quality buffer portion.

In this manner, quality data for a data block may correspond to the receive quality experienced by the receiver at the time of reception of the data block. The selection mechanism 112 may select which delay buffer to provide data to the output in dependent on the quality of the data stored in the quality buffer portions.

Although the quality information has been depicted as a value between 0 and 10, it will be appreciated that this is by way of example only. In other examples, the quality information may be implemented as another indication, for example in some examples the quality information may simply be a good or bad indication if the quality is deemed to be above or below a threshold.

Figure 3A:
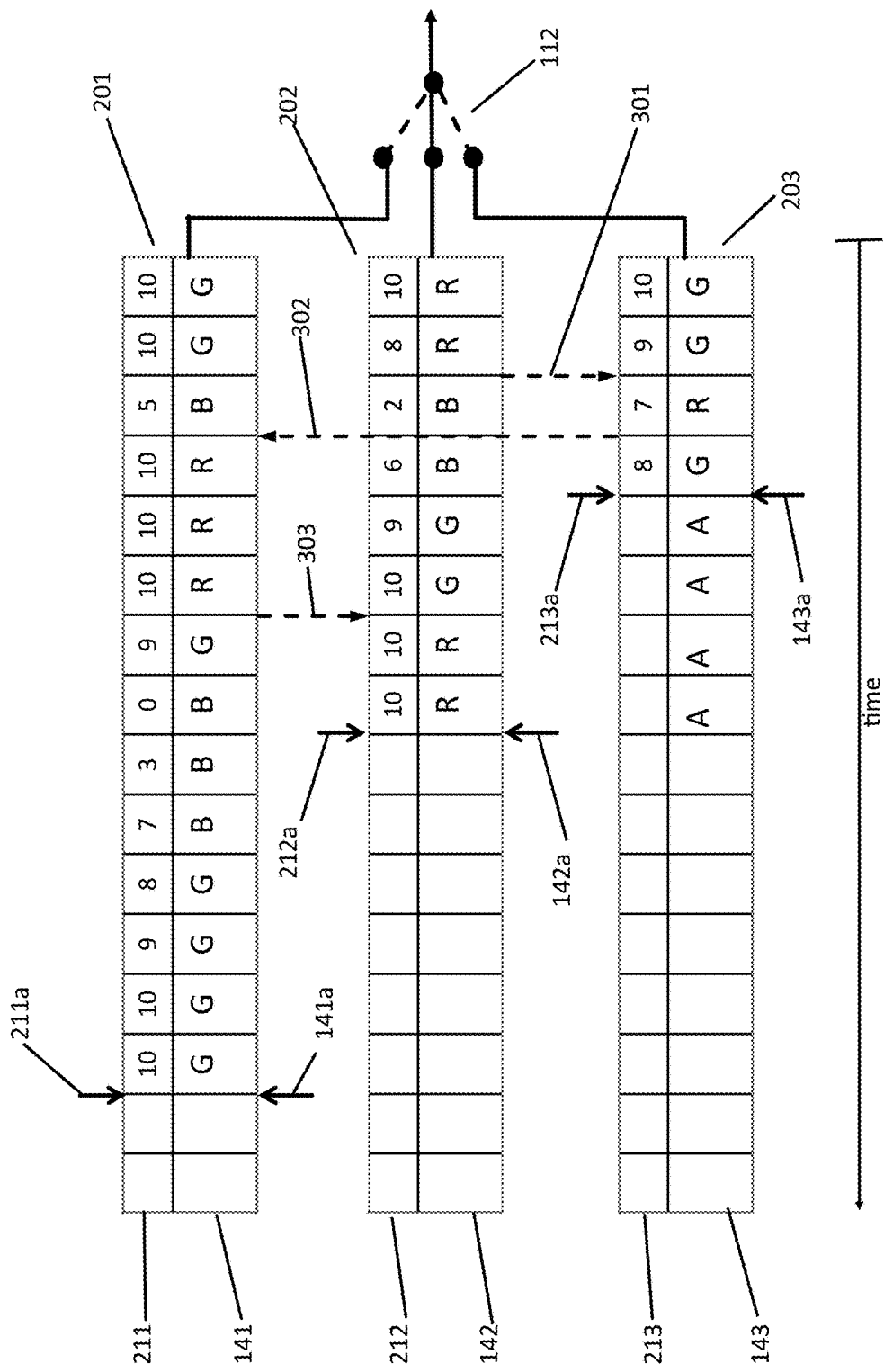
FIG. 3a shows an example of a selection method in accordance with a first embodiment.
Figure 3B:
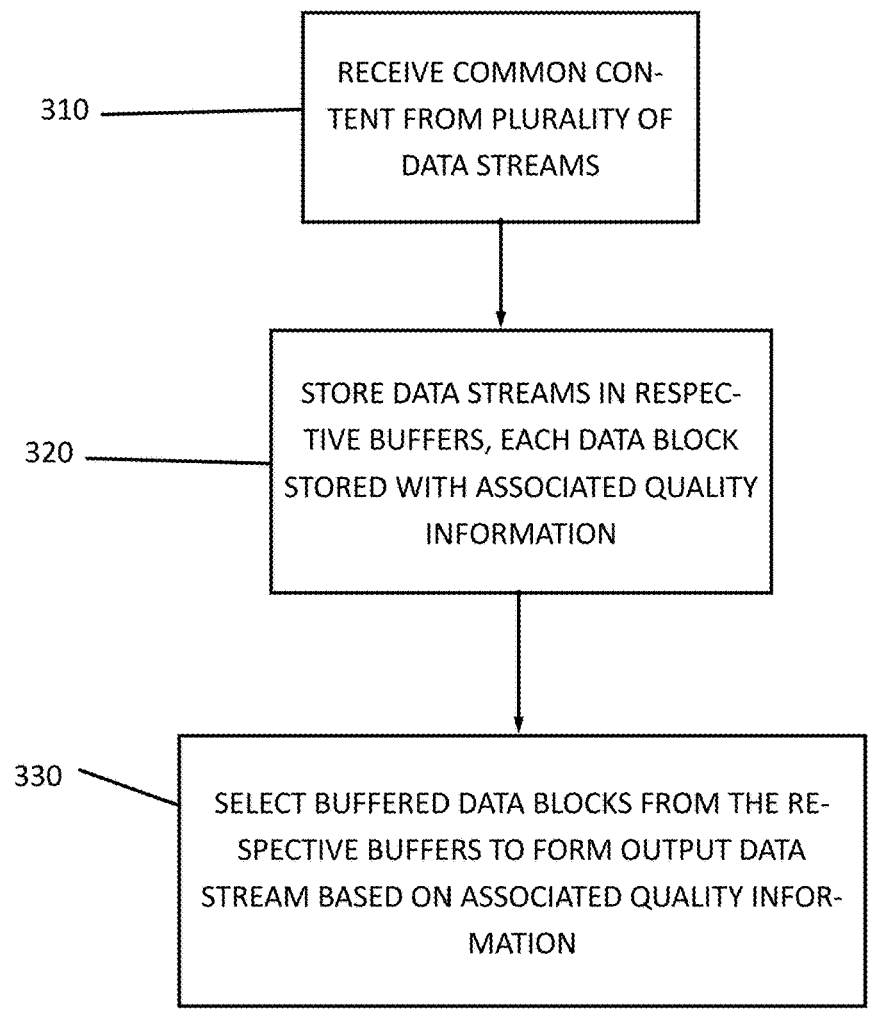
FIG. 3b is a flow diagram depicting method steps that may be carried out in accordance with a first embodiment.

The available of the quality information may be used by the receiving device in various algorithms to attempt to optimise the quality of the output data. FIGS. 3a and 3b give an example of using the quality information to select the highest quality data to be output.

FIG. 3a shows an example where the selection of the data to be provided to the output is based on the quality of the available data. FIG. 3a is similar to FIG. 2 with the addition of indicating which of the delays buffers 201, 202, 203 are selected for output at which time. FIG. 3a explicit indicates which of the data blocks stored in the buffers are rendered to the output. It will be appreciated that in operation data blocks are written to and read from the buffers continuously. FIG. 3a shows the state of the buffers at one time. Because the buffered data is available in the buffers, the selection mechanism may make a determination of which buffer to choose ahead of time. At the time of FIG. 3a, 14 data blocks and associated quality information have been stored in the first delay buffer 201, 8 data blocks and associated quality information have been stored in the second delay buffer 202, and 4 data blocks and associated quality information have been stored in the third data buffer 203. It can been seen from this that, due to processing delays, the first receive path is ahead in time with respect to the second and third receive paths and as such, the first receive path buffers 14 data. The second delay buffer 202 is ahead with respect to the third data buffer 203 and as such, the second data buffer 202 buffers 8 blocks. The third data buffer 303 is the data buffer of the receive path experiencing the greatest delay. Although the third receive path theoretically does not need to buffer any data blocks as it is the slowest path, the third path may buffer four data blocks to allow a period of time for processing to occur, however it will be appreciated in some examples, the third buffer 203 may buffer fewer or no data blocks. In this case, buffered data blocks and associated quality information is available for a determination of which buffer 201, 202, 203 to couple to the output at which time.

In this example, the second buffer 202 is initially selected as the output buffer. The first and second data blocks stored in the second buffer 202 have associated quality parameters of 10 and 8 respectively and are considered to be good quality and selected to be rendered to the output. The data blocks rendered to the output are marked as R.

The third data block of the second buffer 202 however is of low quality (2) and thus the selection mechanism determines that another receive path should be switched to. The third data block of the third receive path has a quality (7) higher than that of the third data block (5) of the first receive path and the third receive path is switched to for the third data block at 301.

For the fourth data block, the third data buffer 203 and first data buffer 201 both store data of sufficient quality. In some examples, if two buffers have stored data blocks of sufficient quality, the buffer corresponding to the receive path with the least transmit path delay may be selection. This is the case in this example and so the first data buffer 201 is selected as output at 302.

The fourth, fifth and sixth data blocks of the first buffer 201 are all rated 10 and these are selected to be rendered to the output. The fifth data block of the first buffer has a quality of 9, while the fifth data block of the second buffer has a quality of 10 and thus, at 303, the selection is changed from the first buffer 201 to the second buffer 202. At the second buffer, the fifth and sixth data blocks are selected to be rendered to the output.

It will be appreciated, that due to the buffering of received data, the selection of a data block to be output may be made ahead of time. As the data is rendered to the output new data may be buffered and the selection mechanism may make further determinations for the new buffered data in dependence on quality buffer portions associated with the new buffered data.

FIG. 3b is a flow diagram depicting the method steps that may be associated with selecting output data blocks based on quality information associated with and stored with those blocks.

At step 310 of FIG. 3b, a plurality of data streams are received. The data streams are each made up of data blocks and comprise common content. At step 320, each data stream is stored in a respective data buffer, for example the buffers 301, 302 and 303. In addition to storing the data block of a data stream in a buffer, quality information for each of the data blocks is stored with that data block. The quality information may correspond to a quality experienced by the receive path at the time at which the associated data block is received. Buffering the data streams may further be used to align the common content carried within the streams by delaying one of more of the data streams. This delaying may comprise providing a read or output pointer for each buffer that points to a corresponding position in the common content in each buffer. The read pointers for each buffer may be synchronised such that if a buffer selection is changed, the newly selected buffer is configured to continue to output a data block corresponding to a next block of the common content.

At step 330, buffered data blocks are selected for output based on their associated quality information. This may be carried out, for example, by a selection mechanism and blocks selected from the plurality of buffers may be multiplexed to form an output packet stream carrying the common content.

The examples of FIGS. 3a and 3b have depicted selecting between the available data in the data buffers in dependence on the quality information associated therewith. It will however be appreciated that there may be various algorithms for selecting the data blocks for output based on their associated quality information.

In one example, the selection mechanism may prioritise the selection order of the buffers in an order of the amount of buffered data available (in other words prioritise selecting a buffer for a receive path experiencing the least delay). In the case of selecting between two buffers, a buffer buffering a packet stream experiencing the least delay of the two may be selected. This allows the buffer having a larger amount of buffered data to be selected. For example, the selection mechanism may select the first data buffer 201 over the second and third buffer 202 and 203 when data of equal quality is available and select the second data buffer 202 over the third data buffer when data of equal quality is available.

In another example, the selection mechanism may prioritise the currently selected receive path (or buffer). For example, if a next block of data in the selected buffer is of sufficient quality but of a lower quality than a corresponding block of data in another buffer, the selection mechanism may stick to the currently selected buffer for output. In another embodiment, the selection mechanism may take into account the number of sequential blocks of data of sufficient quality that are available in a buffer. For example, a buffer with a largest amount of contiguous data blocks of sufficient quality may be selected over a buffer with fewer contiguous data blocks of a better quality.

It will therefore be appreciated that the selection of a data block may be based on various factors in addition to the available quality of that data block, however that the selection will always be based, at least partially, on quality information associated with the buffered data block.

As described, the inclusion of a quality indication associated with a data block may allow the quality of buffered data blocks for a receive path to be known. In the foregoing it has been assumed that a data block of sufficient quality will be available to be selected to be output from one of the receive path buffers at any given time. It will however be appreciated that in some cases, no data blocks of sufficient quality may be available to be output. In some cases a data block of insufficient quality may be selected to be output at the cost of reduced audio quality to a user.

Embodiments may provide error concealment processing to be carried out on the buffered data blocks. Error concealment processing may comprise the concealment of audio data of low quality by muting the low quality data or otherwise attenuating it to reduce the impact of the low quality data block. The inclusion of quality information associated with the buffered data blocks may be used to gradually introduce error concealment in advance of rendering a block of low quality. This may reduce the impact of the concealed error to a user. For example, if audio corresponding to a low quality block is to be muted, the preceding blocks the common data stream may be gradually muted.

Figure 4:
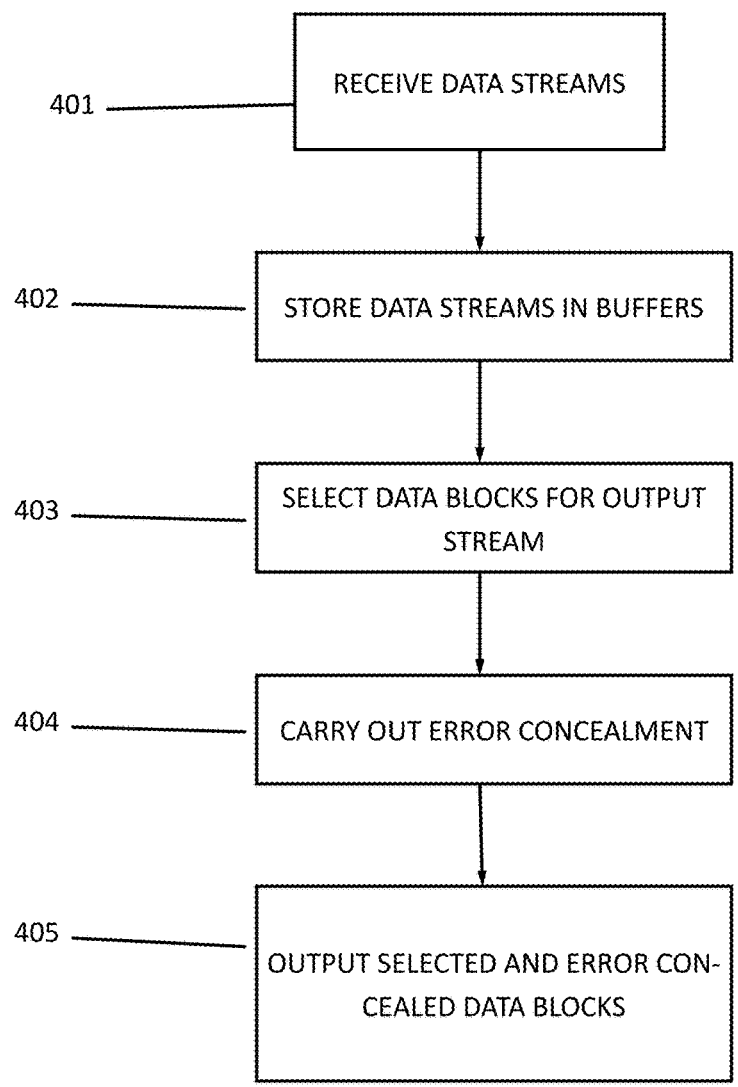
FIG. 4 is a flow diagram depicting the method steps of a first example.

FIG. 4 is a flow diagram depicting the method steps associated with an example of applying error concealment processing based on quality information associated with buffered blocks.

At step 401 of FIG. 4, a plurality of data streams are received at a receiver system. Each of the plurality of data streams may be received over a respective receive path. The data streams may be received from a common source.

At step 402, the data streams may be stored in respective buffers, for example buffers 201, 202, 203 or 301, 302, 303. The data streams may comprise a series of data blocks and the data blocks may be buffered in order to align the common content between the data streams. Each data block may be stored along with quality information associated with that data block. The quality information may correspond to a quality of a receive path at the time at which the data block was received.

At step 403, data blocks are selected to form an output data stream carrying the common content. The data blocks may be selected in dependence on their associated quality information. For example, the data block may be selected to select data blocks with the highest available quality as indicated by the associated quality information.

At step 404, error concealment processing may be carried out on the selected data blocks. At step 405, the select and error concealed data block may be output to be rendered.

In the foregoing it has been described that error concealment processing is carried out the selected data blocks. It will be appreciated that the error concealment may not be carried out on every block selected to be output in an output data stream, but carried out for blocks of insufficient quality. It will also be appreciated that the error concealment processing may not just be carried out a data block with insufficient quality, but may be applied gradually to the preceding and/or subsequent selected data blocks.

Figure 5:
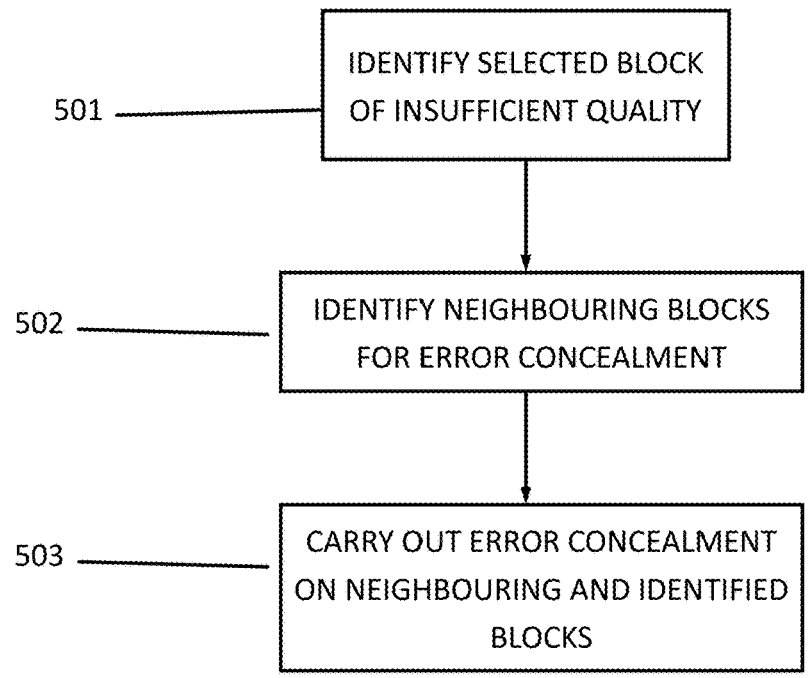
FIG. 5 is a flow diagram depicting method steps that may be carried out in accordance with a second example.

FIG. 5 is a flow diagram that depicts the method steps that may executed to provide the step 404 of carrying out error concealment processing as described in FIG. 4. It will be appreciated that an error concealment algorithm may be run using a processor of a receiver system such as the receiver system of FIGS. 2 and 3a. Although examples of error concealment algorithms are given, it will be appreciated that a variety of algorithms or processing may be implemented and embodiments allow such processing to be implemented in dependence on the quality of available data blocks.

At step 501 of FIG. 5, a data block is identified as being of insufficient quality to be rendered to the output without error. The identified data block may form part of a plurality of selected blocks (selected at step 403). The selected data blocks may be buffered in a plurality of buffers and may be identified for example by a list of addresses that indicate a receive path buffer and buffer position for each of the selected data blocks in one example. In another example, the selected data blocks may have been stored in a selected data block buffer.

At optional step 502, the processor may further identify a number of data blocks neighbouring the identified data block in the buffer in which the identified data block is stored. These neighbouring data blocks may be used to gradually apply error concealment to the identified data block. Step 502 may be carried out in the case that gradual error concealment processing is carried out of preceding and/or succeeding blocks to an identified block of insufficient quality.

At step 503, error concealment processing is carried out on the identified and (optionally) neighbouring data blocks.

The error concealment may for example be a method to conceal audio artefacts or errors within the common content. One method of error concealment may comprise muting a data block (or the portion of the common content carried therein). In another example, the data block (or the portion of the common content carried therein) may be subject to high-cut or low-cut filtering. In order for the implementation of such muting or filtering not to be obvious to the user, the error concealment may be gradually applied to data blocks neighbouring, for example preceding and/or following, the data block of insufficient quality. Another method may be for example the insertion of noise into a data block to cover up an audio artefact. In this and other cases, the error processing may only be applied to the identified block with insufficient quality. In another examples, the identified blocks may be replaces by other blocks, for example duplicate or template blocks to cover up block with low or insufficient quality.

It will appreciated that the error concealment processing may, in some cases, require an additional buffer to carry out error concealment. In a first example, no additional buffer is provided and error correction takes place in the receive buffer 201, 202, 203 or 301, 302, 303 of each receive path. It will be appreciated that by carrying out the error processing directly in these buffers, the data in the buffers will be modified. In other cases, the original data may be desired for other purposes and additional; buffers in parallel with the receive path buffers may be implemented in which duplicate buffered data blocks may be modified. In either case, after the error processing has been carried out, either the receive path buffers or the additional buffers will store error corrected data blocks for each receive path. The error corrected data blocks may correspond to data blocks received from a receive path that have been error corrected. In this example, neighbouring data blocks are considered to be the data blocks neighbouring the identified data block in the receive path buffer.

In the example where error processing is carried out on selected blocks in a first receive path buffer, the error concealed selected data blocks may be stored by overwriting the original data block with a corresponding error concealed data block. The same processing may be carried out for the remaining receive path buffers. The selection mechanism may then switch between the receive path buffers to output the error concealed selected data blocks that form the output data stream. Because the identified data blocks undergo error concealment processing from their respective receive path buffers, the method of the error concealment processing may be specific to each receive path.

In a further example the selected data blocks may be output to a selected data block buffer. The selected data block buffer may be implemented after the selection mechanism 112. Error concealment processing may then be applied to the data blocks stored in the selected data block buffer. In this example, neighbouring data blocks are considered to be the data blocks neighbouring the identified data block in the selected data block buffer. In this example only one additional buffer, configured to store data blocks and quality information, need be implemented. The error concealment processing may, in one example, may be generic to all In another example, the selected data blocks buffer may further be configured to store meta-data indicating for each selected data block, a receive path over which that data block was received. This meta-data may be used to implement receive path specific error concealment processing for the data block.

It will be appreciated that the error concealment processing is only applied if no data block of sufficient quality is available on any of the receive paths.

In the foregoing, the application of error concealment processing has described. It will however be appreciated that embodiments are not limited to such and gradual concealment processing may also be used to support a gradual change in case a switch is made between different receive paths having data streams with different properties such as different spectral content, dynamic range compression and/or levels.

In the foregoing error concealment processing has been described. It will however be apparent, that embodiments may be applicable to any type of audio data processing.

In the foregoing receive paths corresponding to broadcast standards such as FM, DAB and internet broadcast have been referred to. It will however be appreciated that the receive paths may adhere to any particular standard and two or more of the paths may in some examples, adhere to the same standard.

The invention claimed is:

1. A method comprising:
   receiving a plurality of data streams, each data stream comprising a respective plurality of data blocks carrying common content;
   storing the data blocks of each data stream in a respective buffer including storing quality information associated with each data block;
   selecting stored data blocks from the respective buffers to form an output data stream carrying the common content and carrying out signal processing on the selected data blocks in dependence on the associated quality information; and
   outputting the selected and error concealed data blocks;
   wherein the quality information associated with each data block corresponds to a quality experienced by a receive path at the time of reception of each data block.

2. The method of claim 1, wherein the signal processing comprises error processing.

3. The method of claim 2, wherein the error processing comprises identifying a first data block having associated quality information that is below a quality threshold.

4. The method of claim 2, further comprising identifying one or more data blocks neighbouring the identified first data block.

5. The method of claim 4, wherein the error processing further comprises applying a filter to the identified first data block and one or more neighbouring data blocks.

6. The method of claim 3, wherein the identified first data block and neighbouring data blocks are identified within each respective buffer.

7. The method of claim 3, wherein the method further comprises storing the selected data blocks in an output data stream buffer.

8. The method of claim 3 wherein the identified first data block and neighbouring data blocks are identified within the output stream buffer.

9. An apparatus comprising:
- a plurality of inputs configured to receive a plurality of data streams, each data stream comprising a respective plurality of data blocks carrying common content;
- a plurality of receive buffers, each configured to store the data blocks of a respective on of the plurality of data streams including storing quality information associated with each data block;
- a processor configured to select stored data blocks from the respective buffers to form an output data stream carrying the common content and carrying out signal processing on the selected data blocks in dependence on the associated quality information; and
- an output configure to output the selected and error concealed data blocks;
- wherein the quality information associated with each data block corresponds to a quality experienced by a receive path at the time of reception of each data block.

10. The apparatus of claim 9, wherein the processor is configured to carry out error processing.

11. The apparatus of claim 10, wherein the processor is configured to identify a first data block having associated quality information that is below a quality threshold.

12. The apparatus of claim 10, wherein the processor is configured to further identify one or more data blocks neighbouring the identified first data block.

13. The apparatus of claim 12, wherein the processor is configured to apply a filter to the identified first data block and one or more neighbouring data blocks.

14. The apparatus of claim 9, wherein the signal processing comprises equalising data streams from two of the respective buffers.

15. The apparatus of claim 9, wherein each respective buffer is a first in first out FIFO and read pointers for each of the buffers are synchronised.

\* \* \* \* \*